United States Patent
Aupetit et al.

(10) Patent No.: US 11,222,453 B1
(45) Date of Patent: Jan. 11, 2022

(54) INTERACTIVE VISUAL DATA CATEGORIZATION SYSTEMS AND METHODS

(71) Applicant: Qatar Foundation for Education, Science and Community Development, Doha (QA)

(72) Inventors: Michael Jean-Marie Aupetit, Doha (QA); Ala Abuthawabeh, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 0 days.

(21) Appl. No.: 17/119,762

(22) Filed: Dec. 11, 2020

(51) Int. Cl.
*G06T 11/60* (2006.01)
*G06F 3/0484* (2013.01)

(52) U.S. Cl.
CPC .......... *G06T 11/60* (2013.01); *G06F 3/04845* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2014/0229879 A1* | 8/2014 | Lee | G06F 3/04842 715/771 |
| 2017/0212983 A1* | 7/2017 | Cai | G16B 40/00 |
| 2019/0270118 A1* | 9/2019 | Araujo-Simon | G06N 7/00 |

OTHER PUBLICATIONS

Ala Abuthawabeh, Michael Aupetit; "Toward Interactive Labeling with Voronoi Treemaps", Aug. 2019, IEEE (Year: 2019).*

* cited by examiner

*Primary Examiner* — YuJang Tswei
(74) *Attorney, Agent, or Firm* — K&L Gates LLP

(57) ABSTRACT

The present disclosure provides interactive visual data labeling systems and methods that improve upon power-diagram Voronoi Treemaps by supporting interactive arranging and grouping of objects represented by thumbnail images. The provided interactive visual data labeling system enables new and innovative fluid interactions and direct manipulation of treemap cells to arrange objects and groups of objects, and create, merge, expand, or collapse groups. In effect, these enabled fluid interactions and direct manipulation provide an intuitive, stable, and predictable Voronoi treemap for users. In at least some aspects, the provided visual data labeling system uses a force-directed power diagram technique, which enables controlling the stability of the Voronoi treemap layout and updating it smoothly when dragging a cell across a parent cell. In effect, the predictability and stability enables the Voronoi treemap to react as a user expects during the user's interaction with the treemap.

18 Claims, 10 Drawing Sheets

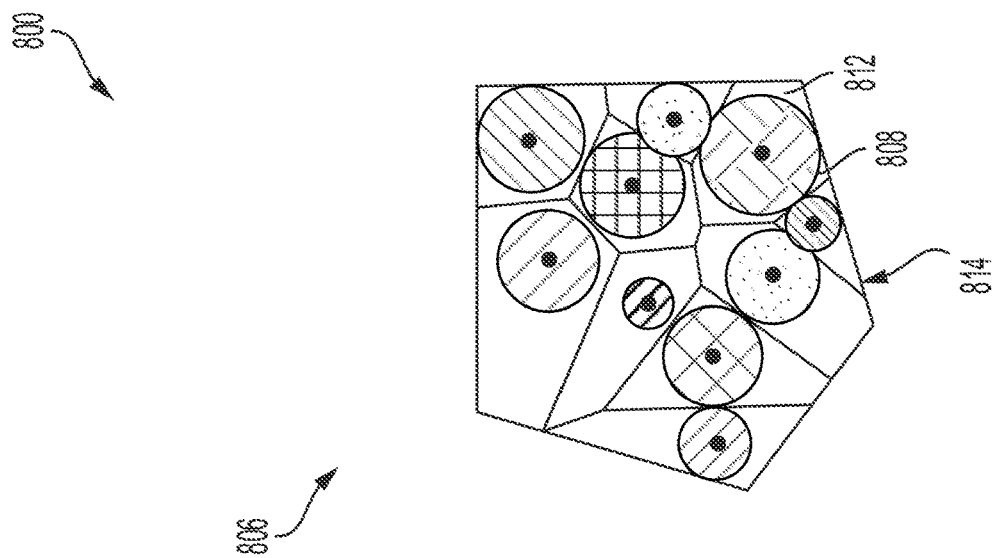
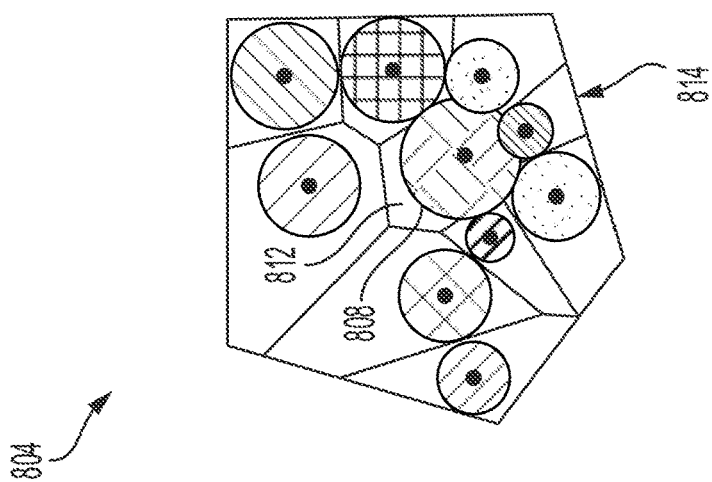
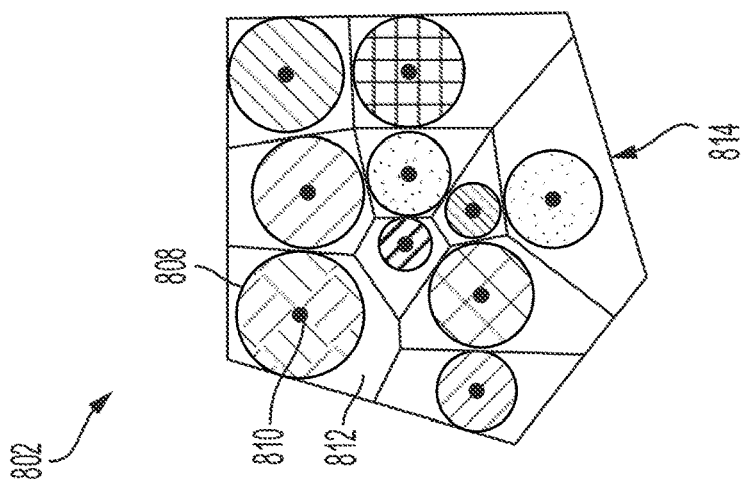
FIG. 8

INTERACTIVE VISUAL DATA CATEGORIZATION SYSTEMS AND METHODS

BACKGROUND

Images can represent real or imaginary places, objects or persons through realistic photos, artistic depictions or iconic summaries, as well as visualizations of abstract data. Spatially arranging and grouping thumbnail images representing objects in a virtual workspace can support users across a wide range of activities. For example, a museum can foster interest into fine-art from its visitors by engaging them in a game to group art pictures by similarity of style; researchers can explore a set of bibliographic documents by arranging and grouping their wordcloud summary into meaningful categories to ease search and help preparing a paper; or a clinician researcher can discover typical sleep patterns from thumbnail images representing daily activity levels of a cohort of patients to create groups that can help verify hypotheses, generate new ones, or derive relevant features to be used to train a parametric model and automatize classification of new data. In other examples, arranging and grouping thumbnail images can support managing desktop files and applications, managing personal photos, analyzing graphical representations of abstract data, exploring multimedia data, etc.

In any of these examples, a large amount of data may exist, and as such, would require a significant amount of time to individually identify and label. Accordingly, a researcher, data analyst, or other suitable party may find it necessary to use some sort of labeling method to quickly and efficiently label the data. In some instances, these individuals may make use of typical visual interactive labeling pipeline methods and systems. Through these typical systems, individuals may combine machine-learning techniques with an interactive visual interface to assist in the labeling of the large amount of data.

In a typical visual interactive labeling pipeline method or system, how a user interactively arranges and groups objects is subjective, and it is therefore an aim of typical systems and methods to help users construct a mental model of the objects, their inner relations, and their links to other users' knowledge. Arranging and grouping is accordingly an important step of the knowledge-building process in the visual analytic pipeline. When measures of similarity can be computed between the objects, interactive or steerable multidimensional projections and clustering can support users achieving the arranging and grouping task on larger sets of objects. There also exist techniques to iconify multidimensional abstract data into thumbnail images from their features, which enable arranging and grouping by direct manipulation of the data as promoted in the semantic interaction framework. And when no good similarity measure exists because no relevant features have yet been determined, interactive arranging and grouping could help the feature engineering process by supporting the discovery of typical patterns in groups of thumbnail images indicating potentially discriminant features to compute.

These typical systems are designed based on the concept that physical space is an effective visual channel to encode similarity between graphical objects on display. This relates to the Gestalt principles of perception where grouping of objects is perceived by proximity (e.g., small relative distance), enclosure (e.g., containment in a box or background area) or similarity (e.g., color or shape). Studies have shown that spatial arrangements simplify perception, and thus humans use space to categorize objects by spatially grouping them proximity (e.g., separating washed from unwashed tomatoes to prepare a recipe). Group perception can be reinforced by adding an explicit enclosure frame (e.g., putting small objects into boxes or on a journal paper to ease search tasks), or visual similarity cues (e.g., adding distinctive color stickers or symbolic markers on otherwise similar objects or containers for instance on document ring binders). Moreover, grouping objects even coarsely, improves perceptual acuity of small differences within groups and helps decide about refined categorization by easier side-by-side comparison of objects within a group (e.g., grouping jigsaw puzzle pieces by color, then by borders, corners or other shape). Hierarchical grouping then speeds up visual search of objects similar to a query object. At last, pairwise comparison between nearby objects helps test ordering and categorization hypotheses.

Grouping by proximity is implicit as it relies on a user's own judgment to separate groups enough to distinguish them, but under size and reachability constraints of the workspace. Conversely, grouping by enclosure or similarity is explicit as it requires determining a few categories first (though it is not known how many are needed), that will be encoded either as visually distinct containers, or by colors or symbolic markers. In virtual workspaces, implicit groupings exist only in the user's mind while explicit groupings are also necessarily encoded by the machine.

Thus, explicit groupings have several benefits: they record the user's grouping intent, they are more space efficient and free users from maintaining separation of groups, and therefore enable uniform spreading of the objects, which improves their visibility. Explicit groupings also align well with recommendations to avoid occlusions. Occlusion prevents readability of the objects for side-by-side comparison needed to take spatial arrangement and grouping decisions. Occlusion also limits direct manipulation to objects on top of the heap, the only ones visible enough to be dragged or clicked for performing arranging and grouping actions. A space-filling idiom has also been proposed to optimize the use of available screen space, spreading out objects to remove occlusion.

Moreover, grouping by similarity does not require connected arrangement of the objects, while grouping by enclosure does. It has been shown that similarity+enclosure imposing redundant explicit grouping and group connectedness is more desirable than similarity alone because it is better at supporting group-related tasks (e.g., finding if two groups are neighbors, and finding if two objects belong to the same group).

Typical visual interactive labeling pipeline methods and systems utilize multiple interactive arrangement and grouping techniques. Manual arrangement can be unconstrained, allowing free positioning of objects and groups, or constrained to a grid, allowing Explicit representation of objects and groups adjacency. Or, the objects must be grouped with a smaller size at the periphery of the workspace.

Automatic arrangement techniques can be used at any time to smooth the result of user interactions, to remove or limit occlusions, or optimize space utilization. For instance, optimization can be used to align objects on a grid while pushing objects to the next free slot as in sliding puzzles. In unconstrained spaces, regular arrangements can be obtained with Centroidal Voronoi Tesselation (CVT). CVT is used for spatially arranging text objects without occlusion, and to generate picture collages in one typical example. It can spread out the objects to avoid occlusion and to fill the space while preserving their current arrangement.

Grouping can be sequential, when objects are iteratively selected by the user, or parallel, when using a lasso or box selection, or merging the content of two existing groups. One typical system proposes box selection and drag-and-drop to a group icon on the side panel. Another approach uses repositionable and resizable storage bins where objects can be dropped and stored.

Piling interactions typically allow grouping objects into piles, freely arranging the piles and objects in the available space, expanding the piles to explore their content or collapsing them to save space, and selecting the top object to represent the pile. The piling framework has been proposed to explore small multiple visualizations using a variety of pilings interactions for arranging and grouping and other pile-related tasks, such as previewing and browsing the content of a pile, and aggregation to generate a representative thumbnail image that eases between-groups comparisons and content awareness.

One example prior system disclosed in N. Watanabe, M. Washida, and T. Igarashi. Bubble clusters: an interface for manipulating spatial aggregation of graphical objects. In *Proceedings of the 20th annual ACM symposium on User interface software and technology*, pp. 173-182, 2007 proposes bubble clusters to aggregate graphical objects without the need to create explicit groups first. Objects are all surrounded by a bubble and can be dragged. When two bubbles get into contact, their contents merge. A stroke across a bubble or pulling off some of its objects split the bubble. Each bubble forms a group on its own. In a continuous move, one bubble can be used to aggregate several others on its way. By double-clicking, a cluster can be temporarily expanded using placement optimization to spread out the objects for better visibility. This approach uses spatial proximity as implicit grouping together with bubble for explicit grouping.

Typically, prior systems use explicit groupings. However, peripheric storage approaches allow free positioning for the objects but not for the groups. Piles, storage bins, and bubble clusters allow free positioning for both, offer groups expansion and collapse options (ADG), and enforce connectedness of the groups, but they are not space-filling nor do they make explicit the objects and groups arrangements. Conversely, grid-based approaches optimize visibility and space, enforce group connectedness, and make explicit the arrangements by grid adjacency, but they do not allow free positioning.

Grid lay-outs are standard to design a graphical user interface to align objects along orthogonal axes. Several grid-based space filling approaches have been used to organize images into different groups. Grid layouts make explicit the objects and groups arrangements, avoid occlusion and optimize space but they are not designed to reconfigure the layout when few objects are re-arranged as expected in interactive arranging and grouping, and they do not allow free positioning.

Treemaps represent hierarchical data as space-filling maps partitioning the root domain into nested cells with leaf nodes area are proportional to some data dimension. They can be used to display groups and objects as parent and child (leaf) nodes of a two-level hierarchy with unit area for the object cells. The areas of the group cells encode the number of objects they contain, that can serve to quantify the progress of the grouping process, ending when all objects in the initial group have been spread out in the other groups. Quantum treemaps and jigsaw maps are both grid-based approach, although jigsaw maps have optimal layout properties (e.g., preserving stability, order, and locality), which are desirable to support interactive arranging and grouping. Circular treemaps represent nodes in the hierarchy as nested circles arranged with optimal circle packing techniques. Bubble treemaps provide a denser layout than circular treemaps using a force-based packing of circular objects into non-circular grouping contours. Both circular and bubble treemaps show explicit connected groups without occlusion. They allow almost-free positioning (the optimal packing may still update the user-proposed arrangement) and make explicit the objects and groups arrangements (contact points of tightly packed tangential circles), but they are not optimally space filling.

In Voronoi treemaps, each polygon represents a node of the tree and is a weighted Voronoi cell of the diagram constrained by the polygon of the parent cell. The polygon's area is proportional to the node's weight—typically the number of leaves of the underlying branch of the tree. Usually, parent cells are overlaid with a graphical summary of the underlying data like a piece of text or snippet image, and can be color-coded to represent supplementary data. Voronoi Treemaps use CVT or power diagrams to partition the space in explicit nested space-filling convex, connected polygonal cells. Cell adjacency is explicit too and arrangement of cells is almost free (the CVT can slightly update the user-proposed arrangement). Typical techniques for computing power Voronoi treemaps exploit the dual circles of power cells by searching their optimal radius and center, so that the areas of the children's power cells match the target proportion of the area of their parent's cell. However, typical solutions may in some cases lead to dual circles not ending up intersecting their power cell. This is one of the obstacles to making an interactive power Voronoi treemap because the relative positions of the circle and a dual cell are somehow correlated but in a manner hardly predictable by the user. Thus, if the user drags the cell, it is not clear how to move the underlying circle to follow that position still preserving areas. And if the user drag the circle, the cell can slide in unpredictable ways, leading to a low degree of compatibility especially for a drag interaction. One typical system proposes re-centering dual circles within their power cell at each iteration, which improves circle/cell graphical coupling, but does not solve the issue.

Another obstacle to making an interactive power Voronoi treemap is related to there being no constraint to maintain stable positions during the optimization process. The lack of constraint results in possibly dramatic changes of the layout converging to another local optimum if parameters (positions and weights) are slightly modified by the user.

One typical system disclosed by Sud A., Fisher D., Lee H., Fast dynamic voronoi treemaps, 2010 *International Symposium on Voronoi Diagrams in Science and Engineering* (June 2010), pp. 85-94, builds a dynamic additively-weighted Voronoi treemap using a graphic processing unit (GPU) to account for dynamically updated data, but not for interactively re-arranging the positions of the cells and not for a power cells type of layout. Bubble and circular treemaps have been proposed where nodes hierarchy is represented by nested circles or clusters of bubbles. Such bubble and circular treemaps show the hierarchical data structure, but at the expense of empty space between the circles.

In many applications of treemaps, it is desirable to let the user re-arrange the layout interactively by moving cells. For example, a data scientist could spatially group siblings together based on visual patterns of snippet images representing the children, or semantic of their labels, thus creating categories and sub-categories of similar data and annotating them for further processing or analysis. In another example, using a card sorting approach, collaborators could interact with a Voronoi treemap to re-order categories of items, coming to a consensus before making decisions. In another example, a graphical designer could interactively rearrange a treemap to improve its aesthetic. In another example, a journalist could spatially re-order siblings in a treemap to tell a story more coherently with other information manually instead of relying on full automation. Typical techniques that compute a static layout, however, cannot be easily interactively rearranged after the static layout computation because it would result in dramatic changes in the layout. Indeed, when considering dynamically updated treemaps, and following apprehension principles implemented for designing animated transitions of statistical data graphics, it is desired that an interactive treemap layout be both stable and predictable. For instance, when data or tree structure change, the positions and areas of the cells should change minimally, and changes should happen in a predictable way.

Fluid treemap interactions allow dragging a copy of a cell nearby any other one for side-by-side comparison. This is relevant to decide about re-arranging the cells, but no arranging and gathering actions are proposed. Another action emphasizes the tree structure by laterally shearing the cells depending on their level in the hierarchy. Other common interactions relevant to Treemaps representing deep data hierarchy are drill-down and roll-up for data browsing. For circular treemaps, a focus+context interaction is proposed in which clicking on a child node focuses the view on that node and expand its size and that of its children while shrinking sibling cells. Dynamic treemap approaches update layout to accommodate changes in the tree structure, by adding or removing cells dynamically with minimal disturbance of the layout. This approach can be used to arrange objects or groups by "teleportation".

In light of the above, existing interactive data labeling systems fail to provide a dynamic and adaptable manner by which a clustering of data items can be labeled, therefore requiring a substantial investment in time by individuals to prepare and label the groupings of data items. Some prior solutions, as noted above, include node-link and bubble tree metaphor systems, grid-based systems, and Voronoi treemap systems.

These four systems and their advantages are most easily differentiated by describing the technical solutions for two technical issues and four corresponding characteristics. The two technical solutions by which the prior systems are distinguished include each system's solution to providing auto-spreading, and grouping and annotation by proximity. Auto-spreading represents a system's ability to avoid image overlapping, for example as multiple data items are moved near one another on a display. A first solution is that of force-directed placement ("FDP") which is standard in node-link and bubble tree systems. A second solution is snap-to-grid ("StoG") and Jonker-Volgenant ("J-V") optimization, as used in grid systems. A third solution comprises the use of Centroidal Voronoi Diagrams ("CVD") to position the cells, standard within Voronoi treemap systems. A benefit of using CVD is that data images may be located anywhere in view on the display, which is desirable for positioning as it provides the most freedom to cluster data items as a user sees fit, whereas the grid, node-link, and bubble tree solutions, which use FDP and StoG/J-V, have more limitations for placement.

The prior systems' technical solutions for grouping and annotation by proximity also have advantages and disadvantages based on the method of the solution. These solutions aim to provide some thresholds for when an item enters or leaves a group based on the connection or distance between the item and a group. In a node-link and Voronoi treemap system, the distances and connections are fixed, encoded within the data by the links or Voronoi adjacency. In grid systems, the groupings are determined based on the adjacency to items and groups according to the position on the grid. In bubble tree systems, the grouping is decided based on the radius and location of the bubbles in conjunction with the location of the data item. Here, the flexibility of the bubble tree and grid systems, allowing for dynamic groupings, 1s preferable to that of the fixed groupings found within node-link and Voronoi treemap systems.

Based on the above technical solutions, four corresponding characteristics may be used to further distinguish the systems from one another. These four characteristics include allowed locations ("Loc."), whether or not additional parameters beyond location are required ("Param."), whether groupings based on proximity are dynamic or fixed ("Neighb."), and whether interactions have been designed to allow for interactive positioning of the items ("Positioning"). Table 1 below contains a summary of these characteristics as corresponding to each particular prior solution as well as a summary of the above-discussed technical solutions.

TABLE 1

| | Technical Solution | | Characteristics | | | |
|---|---|---|---|---|---|---|
| Metaphor | Auto-spreading | G + A by prox. | Loc. | Param. | Neighb. | Positioning |
| Base Layout | None | None | Any | None | None | Interactive |
| Node-link | FDP | Net. topology | Any | FDP | Fixed | Interactive |
| Bubble tree | FDP | Bubble contact | Any | FDP | Rad. + Loc. | Interactive |
| Grid | StoG, J-V | Grid adjacency | Grid | Grid size | Loc. | Interactive |
| Voronoi treemap | CVD | Voronoi adjacency | Any | None | Fixed | Static |

Referring to Table 1 above, certain characteristics are preferred as advantageous over others. Specifically, solutions having "any" for the location characteristic, allowing children items to be placed anywhere on a display, are preferred over those limiting children items' locations to a "grid." In addition, solutions having "none", regarding extra parameters for locations of children items, are preferred over solutions having "FDP" or "grid size" parameter characteristics. Solutions having "Rad.+Loc." or "Loc." neighboring characteristics, referring to the manner by which children items are associated with particular parent groups based on their location, are preferred over those with "none" or "Fixed" neighboring characteristics. Lastly, solutions having "Interactive" positioning characteristics, referring to the ability to interactively position parent groupings, are preferred over those with "Static" positioning characteristics. Though each of the prior solutions have some preferred characteristics, none of the prior solutions provide all of the most advantageous characteristics.

Therefore, there exists a need for an interactive data labeling method and system that allows data items to be located anywhere within the display without further parameters required, dynamic grouping based on the location of the data item and proximity to its neighboring groups, and the ability to interactively position the data items on the display.

SUMMARY

The present disclosure provides interactive visual data labeling systems and methods for Voronoi treemaps that support new and innovative fluid interactions and direct manipulation of treemap cells represented by thumbnail images, including arranging and grouping objects, and creating, merging, expanding, or collapsing groups. In effect, these enabled fluid interactions and direct manipulation provide an intuitive, stable, and predictable Voronoi treemap for users. In at least some aspects, to enable to the fluid interactions, the presently disclosed systems utilize a force-directed power diagram technique. The force-directed power diagram technique enables a user to control a power cell during a move-cell interaction (e.g., dragging a power cell within its parent cell with a drag-move-drop mouse interaction) in a more predictable and stable way as compared to typical systems, which helps the user steer the layout in the user's intended way. The provided system may implement the presently disclosed interactive visual data labeling as a Voronoi treemap in at least some aspects.

In light of the disclosures herein, and without limiting the scope of the invention in any way, in a first aspect of the present disclosure, which may be combined with any other aspect listed herein unless specified otherwise, a system includes a display, a memory, and a processor in communication with the memory. The processor is configured to present, via the display, an arrangement of a plurality of images that each correspond to a respective cell within a parent cell of a Voronoi treemap. Each respective cell includes a node. The system may translate an image within the presented arrangement in response to a received command. The presented arrangement of the plurality of images may be adjusted by the system contemporaneously with the image being translated. The system may also assign the translated image to a group within the presented arrangement in response to the node of the cell of the translated image being translated within a confined region of the group.

In a second aspect of the present disclosure, which may be combined with any other aspect listed herein unless specified otherwise, the received command includes a selection of the image and a dragging of the selected image with respect to the display, and the image is translated as it is dragged.

In a third aspect of the present disclosure, which may be combined with any other aspect listed herein unless specified otherwise, the presented arrangement of the plurality of images is adjusted based on the respective cells of each of the plurality of images.

In a fourth aspect of the present disclosure, which may be combined with any other aspect listed herein unless specified otherwise, each respective cell is associated with a respective circle having a radius and the node of the respective cell, and the node is associated with positional coordinates.

In a fifth aspect of the present disclosure, which may be combined with any other aspect listed herein unless specified otherwise, $\alpha$ is a growth factor, $w_i$ is a target weight of the respective circle, A is an area of the parent cell of the Voronoi treemap, and the radius $R_i$ of a respective circle is calculated according to:

$$R_i(\alpha) = \sqrt{\frac{\alpha * A * w_i}{\pi}}$$

In a sixth aspect of the present disclosure, which may be combined with any other aspect listed herein unless specified otherwise, in a static mode, when an image is not being translated, the arrangement of the plurality of images is based on simulated forces between the respective circles of the cells of each of the plurality of images.

In a seventh aspect of the present disclosure, which may be combined with any other aspect listed herein unless specified otherwise, the nodes of all the circles as a whole have a simulated center of gravity and the simulated forces include a centering force that maintains the simulated center of gravity.

In an eighth aspect of the present disclosure, which may be combined with any other aspect listed herein unless specified otherwise, in a move mode, when an image is being translated, the centering force is turned off.

In a ninth aspect of the present disclosure, which may be combined with any other aspect listed herein unless specified otherwise, the simulated forces include attraction and repulsion forces between two respective circles.

In a tenth aspect of the present disclosure, which may be combined with any other aspect listed herein unless specified otherwise, the simulated forces include an anti-collision force that prevents respective circles from overlapping.

In an eleventh aspect of the present disclosure, which may be combined with any other aspect listed herein unless specified otherwise, in a move mode, when an image is being translated, the arrangement of the plurality of images is adjusted based on the simulated forces between the respective circles of the cells of each of the plurality of images.

In a twelfth aspect of the present disclosure, which may be combined with any other aspect listed herein unless specified otherwise, the simulated forces include a linking force between a first position of the node of a respective cell and a second position of the node of the respective cell.

In a thirteenth aspect of the present disclosure, which may be combined with any other aspect listed herein unless specified otherwise, the processor is configured to generate a new group in response to the node of the cell of the translated image being translated to or outside of a boundary of the Voronoi treemap, the boundary being outside of an established group.

In a fourteenth aspect of the present disclosure, which may be combined with any other aspect listed herein unless specified otherwise, a method includes presenting, via a display, an arrangement of a plurality of images that each correspond to a respective cell within a parent cell of a Voronoi treemap. Each respective cell includes a node. An image is translated within the presented arrangement in response to a received command. The presented arrangement of the plurality of images is adjusted contemporaneously with the image being translated. The translated image is assigned to a group within the presented arrangement in response to the node of the cell of the translated image being translated within a confined region of the group.

In a fifteenth aspect of the present disclosure, which may be combined with any other aspect listed herein unless specified otherwise, the image is a first image, and a second image is transferred to the group in response to a received command. Transferring the second image includes the image disappearing from an initial position and appearing within the confined region of the group.

In a sixteenth aspect of the present disclosure, which may be combined with any other aspect listed herein unless specified otherwise, the group is a first group, and a second group is generated from multiple cells at once in response to a received command.

In a seventeenth aspect of the present disclosure, which may be combined with any other aspect listed herein unless specified otherwise, the group is a first group, and the first group and a second group are merged in response to a received command.

In an eighteenth aspect of the present disclosure, which may be combined with any other aspect listed herein unless specified otherwise, the group includes multiple cells, and the group is translated within the arrangement in response to a received command In a nineteenth aspect of the present disclosure, which may be combined with any other aspect listed herein unless specified otherwise, a non-transitory, computer-readable medium stores instructions, which when executed by a processor, cause the processor to present, via the display, an arrangement of a plurality of images that each correspond to a respective cell within a parent cell of a Voronoi treemap. Each respective cell includes a node. An image may be translated within the presented arrangement in response to a received command. The presented arrangement of the plurality of images may be adjusted contemporaneously with the image being translated. The translated image may be assigned to a group within the presented arrangement in response to the node of the cell of the translated image being translated within a confined region of the group.

In a twentieth aspect of the present disclosure, which may be combined with any other aspect listed herein unless specified otherwise, in an initial presented arrangement of the plurality of images, each of the images is part of a single, unassigned group.

Additional features and advantages of the disclosed system, method and non-transitory, computer-readable medium are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 8 illustrates a process of a move operation for a force-directed power diagram technique, according to an aspect of the present disclosure.

DETAILED DESCRIPTION

The present disclosure relates generally to visual interactive labeling pipelines. More specifically, the present disclosure provides interactive visual data labeling systems and methods that improve upon power-diagram Voronoi Treemaps by supporting interactive arranging and grouping of objects represented by thumbnail images without considering additional features or similarity measures. In at least some aspects, the objects are arranged as a two-level Voronoi treemap including parent cells and child cells. Groups and objects are represented as parent and child cells of the treemap. In such aspects, the presently disclosed interactive visual data labeling system enables new and innovative fluid interactions and direct manipulation of treemap cells to arrange objects and groups of objects, and create, merge, expand, or collapse groups. In effect, these enabled fluid interactions and direct manipulation provide an intuitive, stable, and predictable Voronoi treemap for users. For example, a user may drag a treemap cell with a cursor and the treemap cell remains consistently with the cursor, unlike some typical systems in which the treemap cell may lag behind the cursor and then randomly jump to an unpredictable location.

In at least some aspects, the presently disclosed visual data labeling system also provide for fluidly updating a Voronoi treemap layout when a cell is moved by drag-and-drop. In such aspects, the provided system uses a force-directed power diagram technique which allows controlling the stability of the Voronoi treemap layout and updating it smoothly when dragging a child cell across a parent cell. In effect, the predictability and stability enables the Voronoi treemap to react as a user expects during the user's interaction with the treemap. The force-directed power diagram technique supports side-by-side comparison and free positioning of the cells. The force-directed approach could also support focus+context by controlling the radius and positions of the power circles underlying the interactive Voronoi treemap. The provided force-directed power diagram technique therefore overcomes the limitations of systems that compute static layouts that cannot be easily adjusted via visual interaction after the static layout computation. Additional advantages of the presently disclosed systems and methods will be apparent from the following description of the figures.

Figure 1:
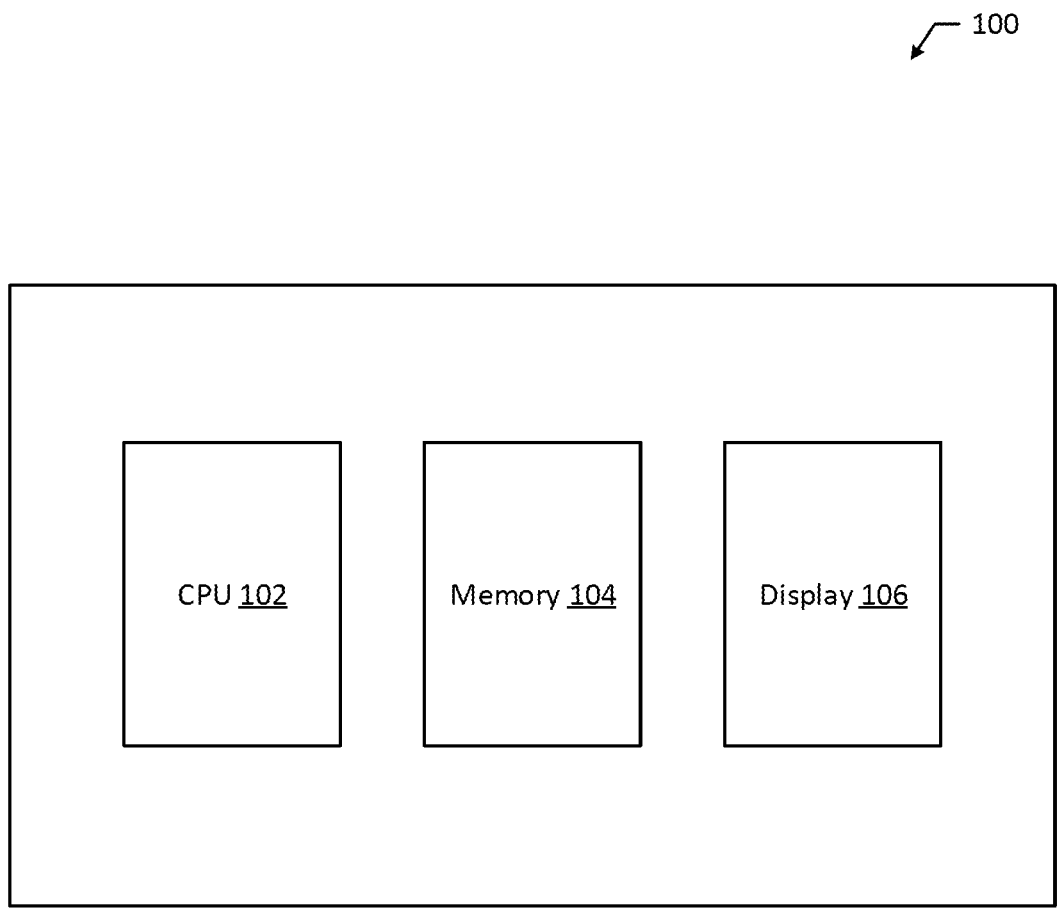
FIG. 1 illustrates a box diagram of a visual data labeling system, according to an aspect of the present disclosure.

FIG. 1 illustrates an example visual data labeling system 100. In other examples, the components of the visual data labeling system 100 may be combined, rearranged, removed, or provided on a separate device or server. The visual data labeling system 100 includes a processor in communication with a memory 104. The processor may be a CPU 102, an ASIC, or any other similar device. The visual data labeling system 100 may also include a display 106. The display 106 may be any suitable display for presenting information for presenting information to a user. In some aspects, the display 106 may be touch display configured to detect various contacts or motions from a user directly contacting the screen, such as with a stylus or at least one of the user's fingers. In various aspects, the visual data labeling system 100 may be a desktop computer, laptop computer, a tablet computer, a smart phone, or other suitable computing device.

The visual data labeling system 100 (e.g., the processor) is configured to present, on the display 106, a Voronoi treemap and to adjust the Voronoi treemap in response to user interaction with Voronoi treemap. In some aspects, the user may interact with the Voronoi treemap using a mouse and a cursor. In other aspects, the user may interact with the Voronoi treemap using a stylus, one or more of the user's fingers, or other suitable methods of interacting with items presented on a display. In such other aspects, a cursor may or may not be presented on the display. The visual data labeling system 100 enables a user to perform a variety of actions or commands when interacting with the presented Voronoi treemap.

Figure 2:
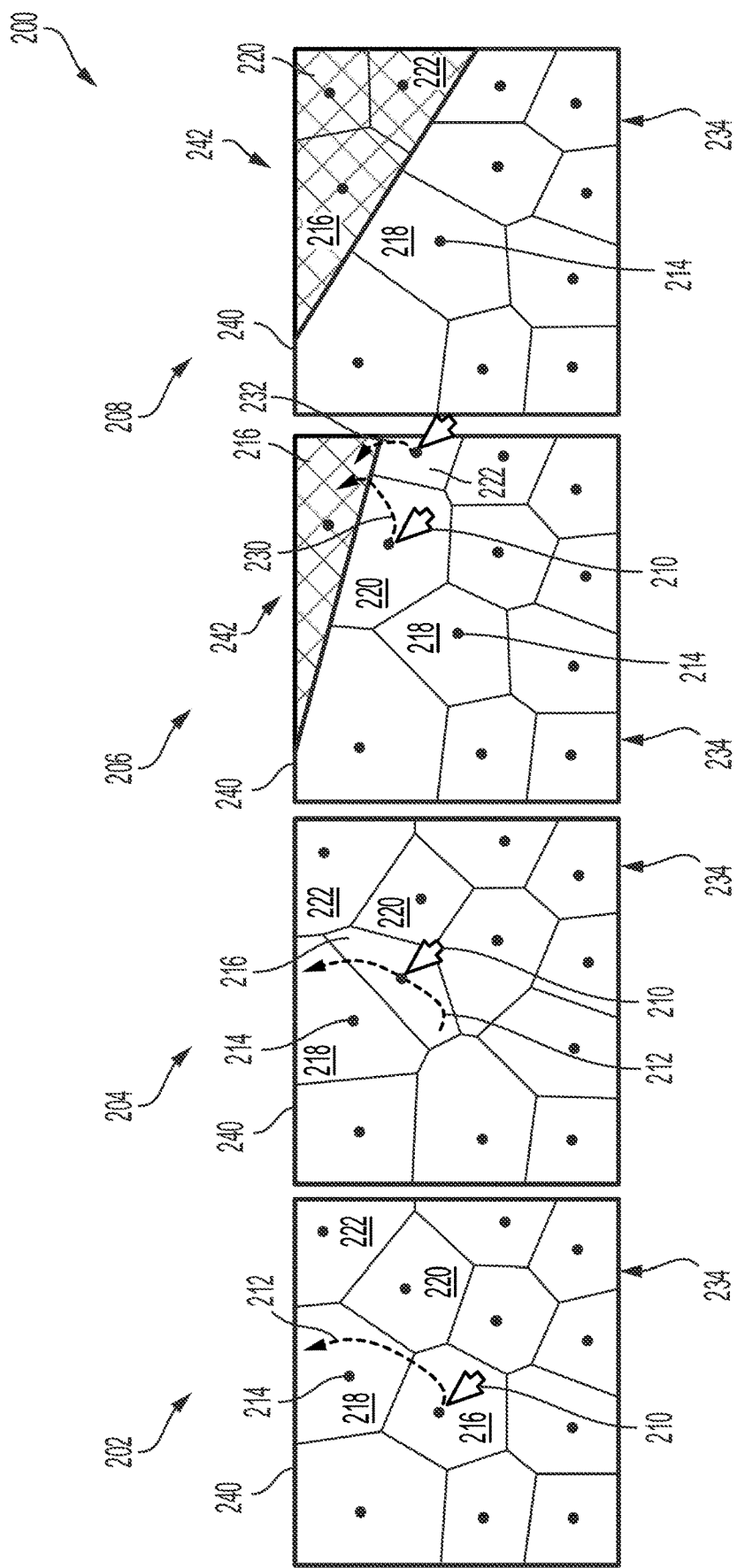
FIG. 2 illustrates a process for an action of creating a group and adding cells to the group, according to an aspect of the present disclosure.

FIG. 2 illustrates an example process 200 for an action of creating a group and adding cells to the group using the visual data labeling system 100. The example process 200 is illustrated as a series of screens 202-208, each of which may be presented on the display 106. The screen 202 presents an initial arrangement of cells in a parent cell 234 of a Voronoi treemap. The cells 216, 218, 220, and 222 are particularly indicated for illustrative purposes. In other examples, the cells may have a different, suitable initial arrangement. Each of these cells presented on the screen 202 include a node, such as the node 214 of the cell 218. It will be appreciated that only the node 214 of the cell 218 is indicated solely for the sake of clarity. In this initial arrangement, none of the cells 216, 218, 220, and 222 (or any other cell in the parent cell) have been assigned to a group. Stated differently, the cells 216, 218, 220, and 222 are all part of a single, unassigned group. In some aspects, any unassigned cell may be presented with the same color (e.g., gray).

Also presented on the screen 202 is an example cursor 210 (e.g., a pointer). In this example process 200, the visual data labeling system 100 enables a user to create a group 242 by dragging a cell (e.g., the cell 216) to or outside of a boundary 240 of the parent cell 234. For instance, a user may select (e.g., position the cursor 210 over the cell 216 and press a mouse button) the cell 216 and drag (e.g., moving the cursor 210 while holding down the mouse button) it along the path 212 to the boundary 240. The example screen 202 illustrates the cell 216 being initially selected. The example screen 204 illustrates the cell 216 partially translated along the path 212. It will be appreciated that the cell 216 is translated all the way to or outside of the boundary 240. Once there, the user may unselect (e.g., release the mouse button or remove the user's finger) the cell 216. In some aspects, the node of the cell 216 must be translated to or outside of the boundary 240 for group creation. Also illustrated in the screen 204 is that the arrangement of the cells in the parent cell 234 is adjusted (e.g., the cells 216, 218, and 220 change shape) as the cell 216 is translated, and that the cursor 210 remains with the cell 216 as each are translated across the screen 204. Each of these features will be discussed more below.

In some aspects, a user may delete a group. For example, a group may be automatically deleted from a parent cell as soon as the group is empty. To delete a group, a user may drag-and-drop a lone remaining cell in a group out of the group. The example screen 206 illustrates a group 242 including the cell 216. In this example, the user may select the cell 216 and drag and drop it outside of the boundaries of the group 242 to delete the group 242.

The example screen 206 illustrates a group 242 including the cell 216 that was created as a result of the above-described group creation process. In at least some aspects, the cells in the group 242 may be presented with a color (e.g., red) different than the color of the unassigned cells. For example, the color of the cell 216 changes from gray to red upon creation of the group 242. In this example, the user may add both the cell 220 and the cell 222 to the group 242. For instance, the user may select the cell 220 and drag it along the path 230 so that the cell 220 is within the boundaries of the group 242, and then unselect the cell 220. To add the cell 222 to the group 242, the user may select the cell 222 and drag it along the path 232 so that the cell 222 is within the boundaries of the group 242, and then unselect the cell 222. In some aspects, the cell 220 or 222 must be dragged such that its respective node is within the boundaries of the group 242 in order to be added to the group 242. It will be appreciated that, although two cursors 210 are shown in the screen 206 for the purpose of illustrating two actions at once, adding the cell 220 and the cell 222 to the group 242 as described are two separate actions. The screen 208 illustrates the cell 220 and the cell 222 added to the group 242. As described above, the color of the cells 220 and 222 may change to the color of the group 242 upon being added to the group 242.

Figure 3:
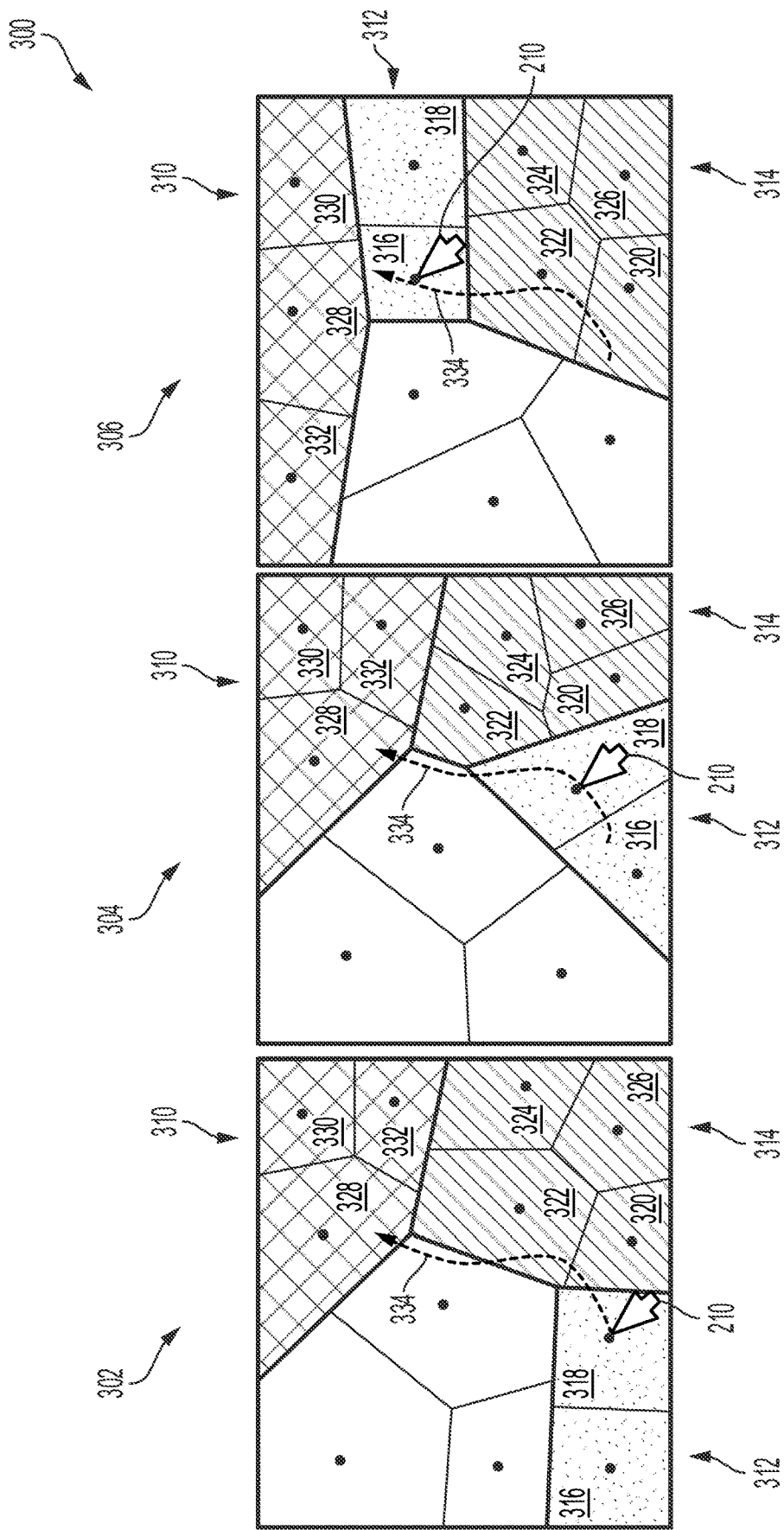
FIG. 3 illustrates a process for an action to move or translate a group of cells within an arrangement of cells, according to an aspect of the present disclosure.

FIG. 3 illustrates an example process 300 for an action to move or translate a group of cells within an arrangement of cells using the visual data labeling system 100. The example process 300 is illustrated as a series of screens 302-306, each of which may be presented on the display 106. The screen 302 shows a parent cell having a first group 310, a second group 312, and third group 314. The first group 310 includes the cells 328, 330, and 332. The second group 312 includes the cells 316 and 318. The third group 314 includes the cells 320, 322, 324, and 326. The remaining cells in the parent cell, which are not indicated, are unassigned. In various aspects, each of the groups 310, 312, 314 and the unassigned group may be presented as a different color. For example, the group 310 may be red, the group 312 may be green, the group 314 may be blue, and the unassigned group may be gray.

In this example process 300, the visual data labeling system 100 enables a user to move the group 312. For instance, the user may select a cell (e.g., the cell 318) within the group 312 with the cursor 210 and pause a predetermined amount of time (e.g., 1 second) prior to dragging the selected cell with the cursor 210. The pause, in this instance, triggers the group 312 to translate rather than the selected cell 318. The user may then drag the cell 318 along the path 334, which translates the group 312 as the user drags the cell 318. The example screen 304 shows the cell 318, and thus the group 312, partially translated as they both follow the cursor 210. Once the group 312 is positioned in the arrangement of cells as the user desires, the user may unselect the cell 318, which sets the position of the group 312. The example screen 306 shows the group 312 repositioned between the group 310 and the group 314.

Figure 4:
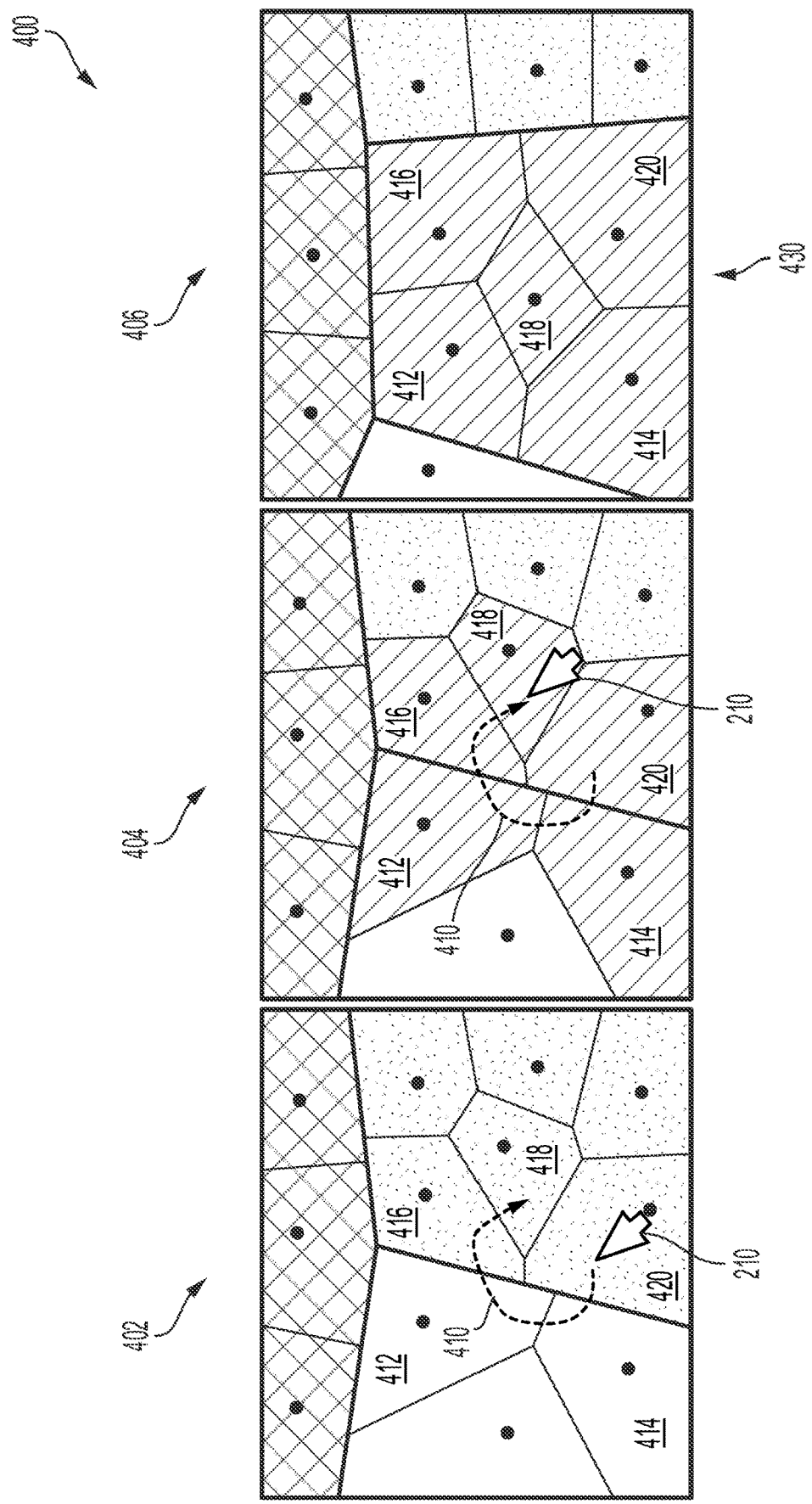
FIG. 4 illustrates a process for an action of creating a new group from multiple cells at once, according to an aspect of the present disclosure.

FIG. 4 illustrates an example process 400 for an action of creating a new group from multiple cells at once using the visual data labeling system 100. The example process 400 is illustrated as a series of screens 402-406, each of which may be presented on the display 106. The screen 402 shows a parent cell including multiple cells, of which the cells 412, 414, 416, 418, and 420 are indicated. In an example, the cells 412 and 414 may be unassigned while the cells 416, 418, and 420 may belong to the same group. In other examples, each of the cells 412, 414, 416, 418, and 420 may be unassigned or have other suitable group arrangements. In various instances, the cells not indicated may be unassigned, assigned to the same group, or assigned to two or more different groups, etc.

In this example process 400, the visual data labeling system 100 enables a user to create a group including the cells 412, 414, 416, 418, and 420 at once, rather than dragging and dropping each of the cells 412, 414, 416, 418, and 420 to a group. For instance, the user may select the cell 420 with the cursor 210, and prior to translating the cursor 210, indicate that multiple cell group creation is intended. For example, the user may press and hold the "CTRL" button on the user's keyboard to indicate such multiple cell group creation intention. In another example, the user may turn on a multiple cell group creation mode. The user may then translate the cursor 210 through each of the cells that the user desires to be included in the group. In this example process 400, the user translates the cursor 210 along the path 410 which passes through the cells 412, 414, 416, and 418. In some aspects, the path 410 must start and end at adjacent cells for multiple cell group creation to occur.

In some aspects, as shown on the example screen 404, the arrangement of the cells in the parent cell does not change during multiple cell group creation. The indication of the intention for multiple cell group creation causes the visual data labeling system 100 to refrain from translating the selected cell 420, or the group to which the selected cell 420 belongs, as it otherwise would in the example processes 200 and 300 described above. In some aspects of the example process 400, a cell may change to a color (e.g., yellow) corresponding to the new group as the cursor 210 translates through the cell during multiple cell group creation. For example, in the screen 404, since the cursor 210 has completed translating through each of the cells 412, 414, 416, 418, and 420, each of the cells 412, 414, 416, 418, and 420 may be presented as yellow. Once the user reaches the final cell that the user desires to include in the new group, the user may release the selection (e.g., release the mouse button or remove the user's finger) and indicate that multiple cell group creation is complete (e.g., release the "CTRL" button or turn off the multiple cell group creation mode). In response, the visual data labeling system 100 may create the group 430 shown in the screen 406, which may include adjusting the arrangement of the cells in the parent cell to accommodate the new group 430.

Figure 5:
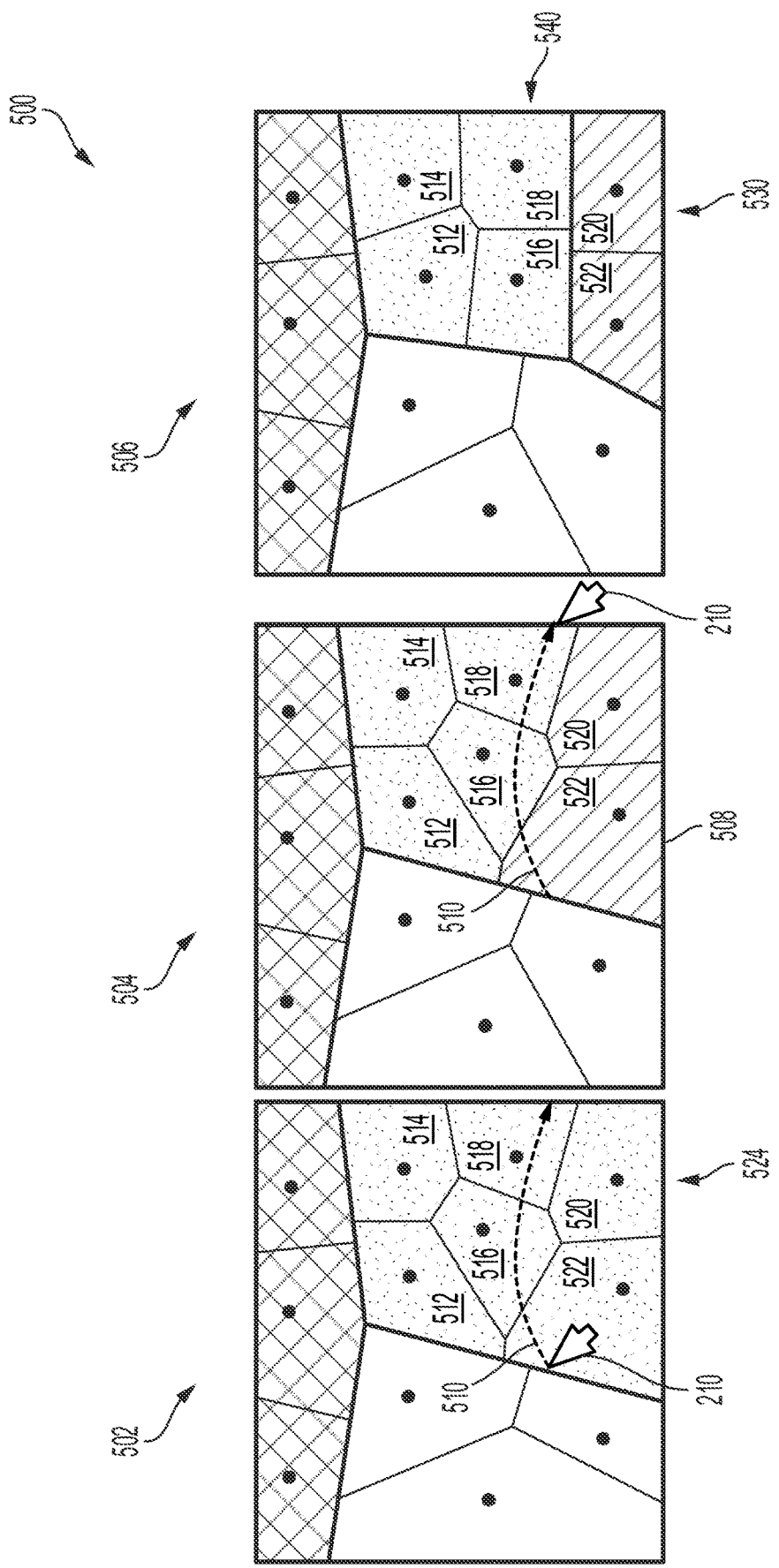
FIG. 5 illustrates a process for an action of separating a group into two separate groups, according to an aspect of the present disclosure.

FIG. 5 illustrates an example process 500 for an action of separating a group into two separate groups using the visual data labeling system 100. The example process 500 is illustrated as a series of screens 502-506, each of which may be presented on the display 106. The screen 502 shows a parent cell including multiple cells, of which the cells 512, 514, 516, 518, 520, and 522 are indicated and belong to the group 524. In various instances, the cells not indicated may be unassigned, assigned to the same group, or assigned to two or more different groups, etc.

In this example process 500, the visual data labeling system 100 enables a user to separate the group 524 into two groups. For instance, the user may select a location in the arrangement of cells with the cursor 210, and prior to translating the cursor 210, indicate that group slicing is intended. For example, the user may press and hold the "CTRL" button on the user's keyboard to indicate such group slicing intention. In another example, the user may turn on a group slicing mode. The user may then translate the cursor 210 along a path 510. The cells (e.g., the cell's node) enclosed by a convex hull of the path 510, the boundary 508 of the parent cell, and the starting cell (in this example, the cell 522) are separated into a new group. In some aspects, a cell may change to a color (e.g., yellow) corresponding to the new group as the cell's node becomes enclosed, prior to the user releasing the selection. For example, in the screen 504, the cells 520 and 522 may be presented as yellow, since the path 510 has enclosed them with the boundary 508 and the starting cell 522.

In some aspects, as shown on the example screen 504, the arrangement of the cells in the parent cell does not change during group slicing. The indication of the intention for group slicing causes the visual data labeling system 100 to refrain from translating a cell having its boundary selected, or the group to which the selected cell belongs, as it otherwise would in the example processes 200 and 300 described above.

Figure 6:
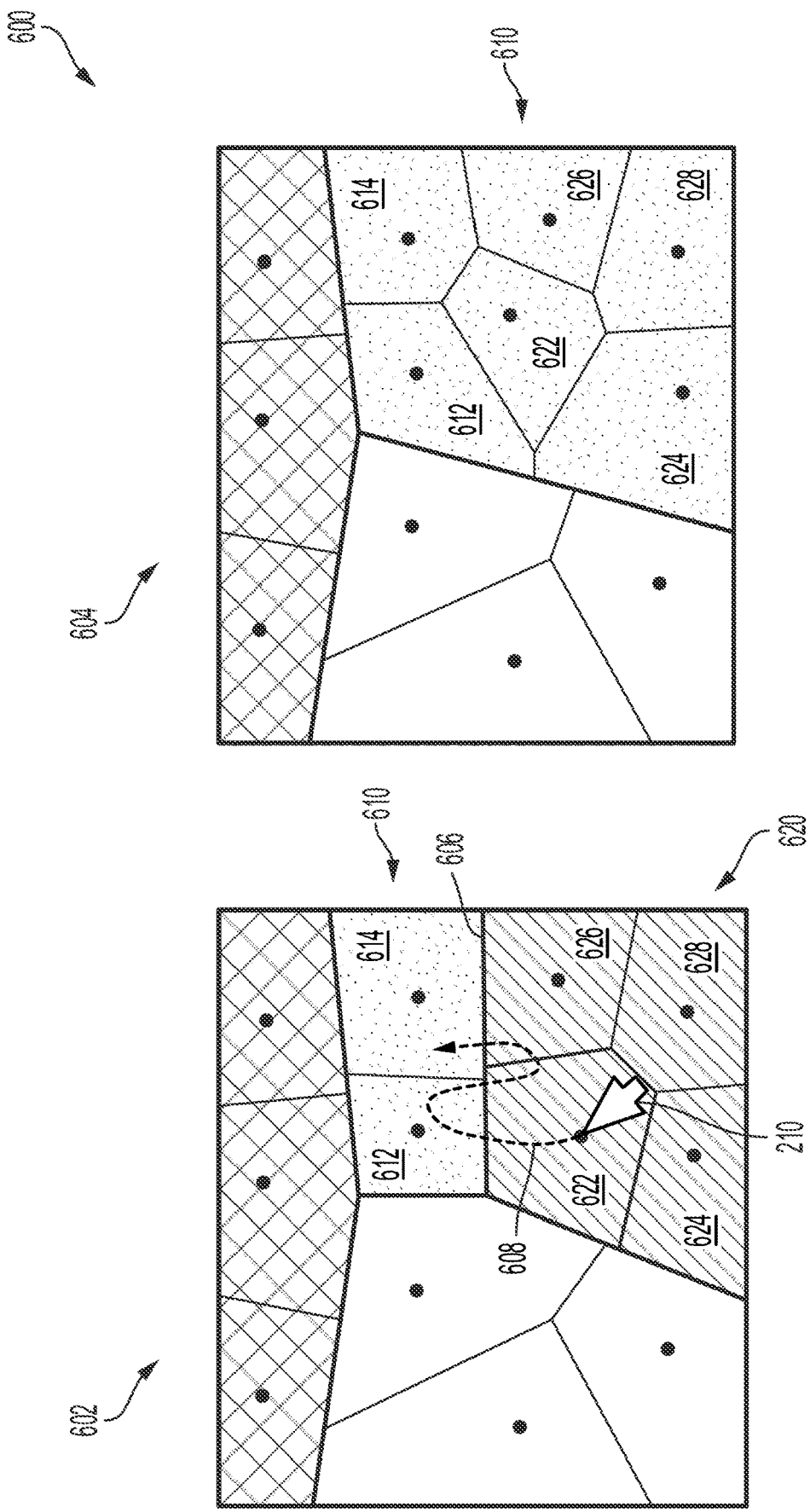
FIG. 6 illustrates a process for an action of joining two separate groups into a single group, according to an aspect of the present disclosure.

The user may release the selection (e.g., release the mouse button or remove the user's finger) to initiate the group splitting. In response, the visual data labeling system 100 may create the group 530—including the cells 520 and 522—and the group 540—including the cells 512, 514, 516, and 518—from the group 524, as shown in the screen 506. In some aspects, creating the new groups 530 and 540 may include adjusting the arrangement of the cells in the parent cell to accommodate the new groups 530 and 540. In some aspects, the enclosed cells must belong to the same group for group slicing to occur. In some aspects, the path 510 cannot cross into cells of any other group for group slicing to occur. The example FIG. 6 illustrates an example process 600 for an action of joining two separate groups into a single group using the visual data labeling system 100. The example process 600 is illustrated as a series of screens 602 and 604, each of which may be presented on the display 106. The screen 602 shows a parent cell including multiple cells, of which the cells 612, 614, 622, 624, 626, and 628 are indicated. The cells 612 and 614 belong to the group 610. The cells 622, 624, 626, and 628 belong to the group 620. In at least some aspects, the group 610 may be presented having a first color (e.g., green) and the group 620 may be presented having a different color (e.g., blue). In various instances, the cells not indicated may be unassigned, assigned to the same group, or assigned to two or more different groups, etc.

In this example process 600, the visual data labeling system 100 enables a user to add the group 620 to the group 610. For instance, the user may select with the cursor 210 a cell (e.g., the cell 622) in the group 620 that is adjacent to the group 610. The user may then drag the cursor 210 along a path 608 that results in the cursor 210 translating back and forth a predetermined quantity of times (e.g., three) over the boundary 606 between the group 610 and the group 620. Though not illustrated, in some aspects, the selected cell 622 may translate with the cursor 210, and the surrounding arrangement of cells may adjust as it does (e.g., because the "CTRL" button is not held down). In some aspects, the selected cell 622 may change to the color of the group 610 once it is positioned within that group.

Once the user completes the action, the user may unselect or release the selection of the cell 622. In some aspects, the group in which the path 608 ends is the surviving group. Stated differently, the group into which the cell 622 is dropped is the surviving group. For example, in this instance, selecting the cell 622 and traversing the boundary 606 three times with the cursor 210 while ending in the group 610 triggers adding the group 620 to the group 610. The example screen 604 shows the group 610 including the cells 612, 614, 622, 624, 626, and 628. In other aspects, the group in which the path 608 ends may be added to the group in which the path 608 begins. In some aspects, as shown on the screen 604, adding the group 620 to the group 610 may include adjusting the arrangement of the cells in the group 610 to accommodate the new cells 622, 624, 626, 628. Some aspects, the cells 622, 624, 626, and 628 of the group 620 may change to the color green of the group 610 upon being added to the group 610.

It should be appreciated that the above described actions are merely examples and the visual data labeling system 100 may enable a user to perform a variety of suitable actions to interact with a Voronoi treemap.

Figure 7B:
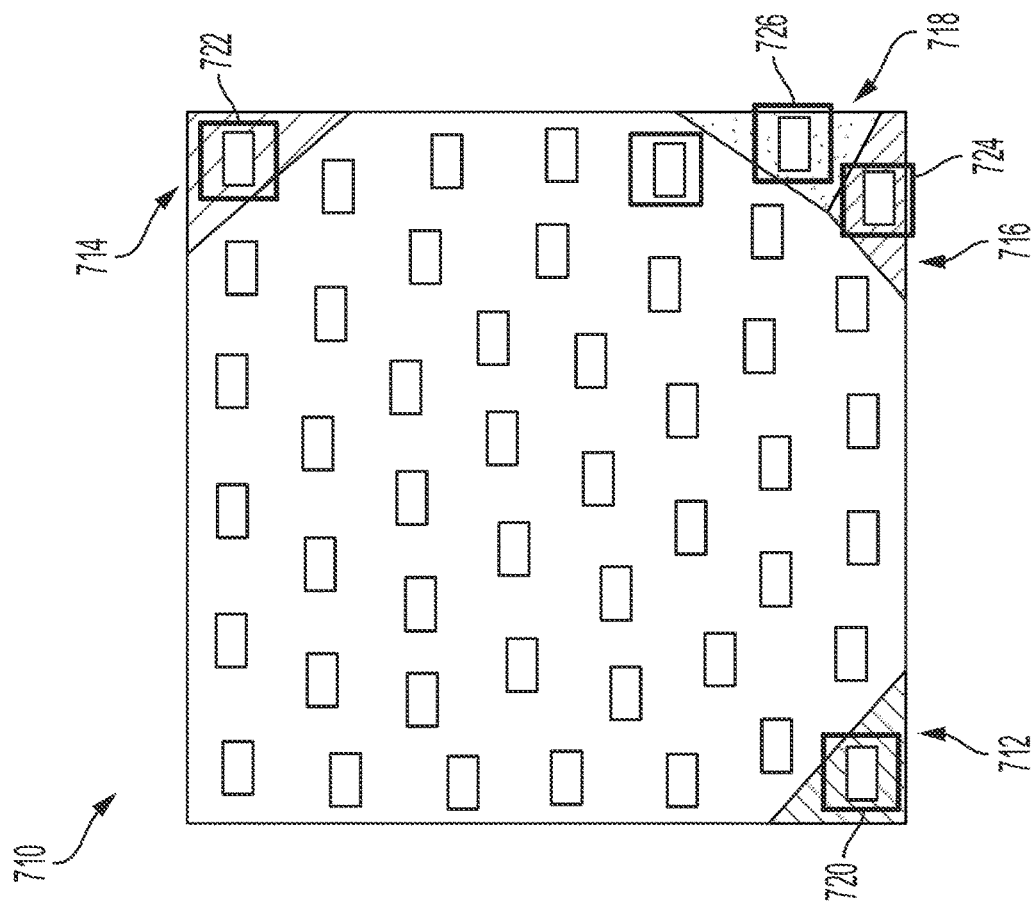
FIGS. 7A to 7D illustrate a series of screen layouts on a display for a use case in which a clinician researcher uses the visual data labeling system of FIG. 1 to group patients by sleep patterns, according to an aspect of the present disclosure.
Figure 7A:
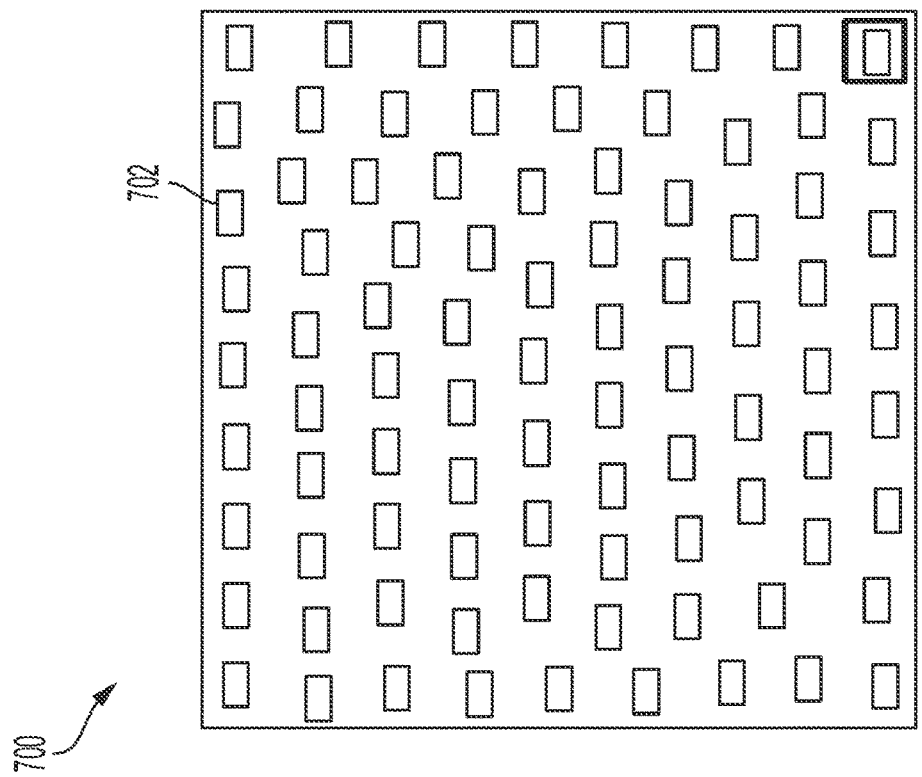
Figures 7C, 7D:
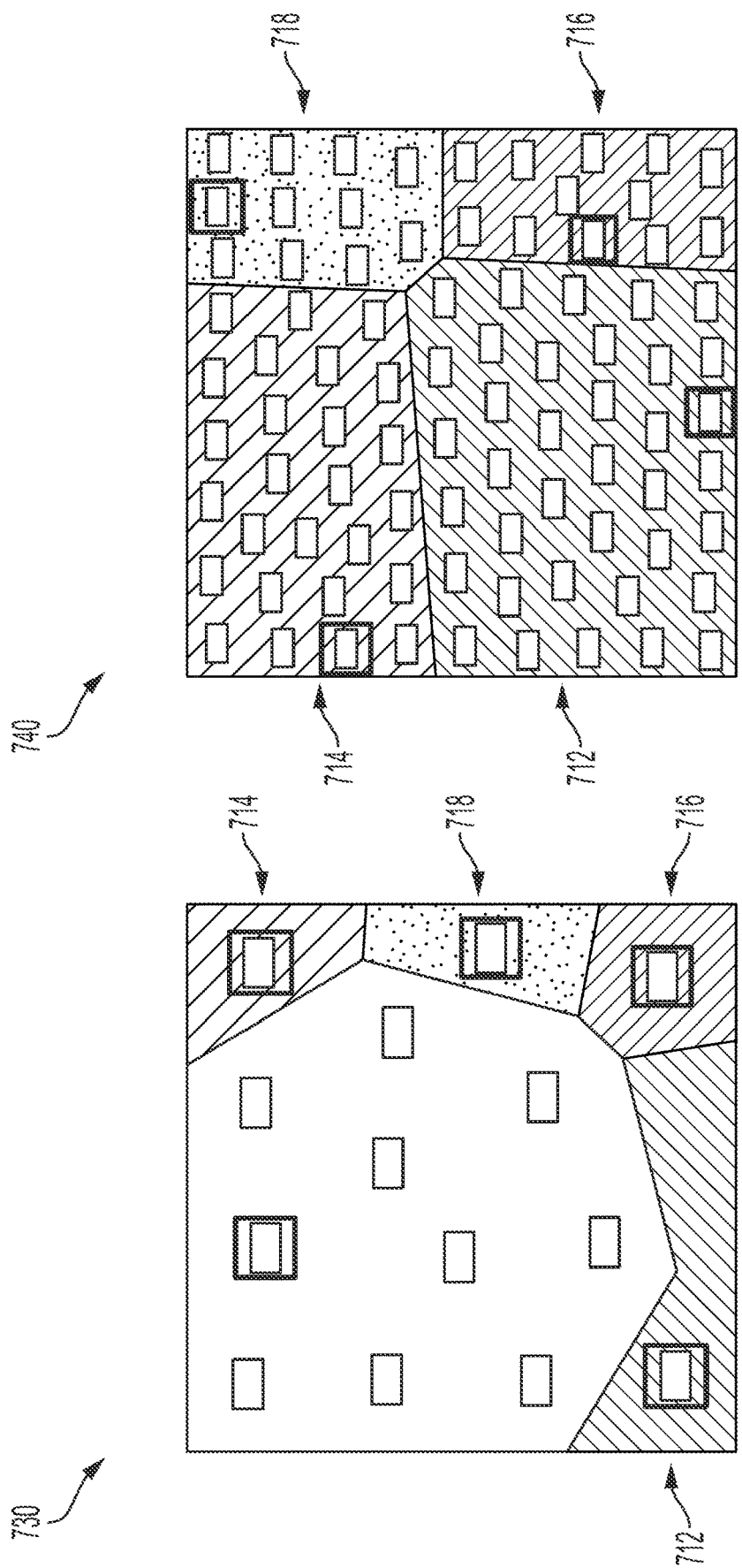

FIGS. 7A to 7D illustrates an example use case in a series of screen layouts 700, 710, 730, and 740 of the visual data labeling system 100 in which a clinician researcher uses the visual data labeling system 100 to group patients by sleep patterns. The screen layouts 700, 710, 730, and 740 may be presented on the display 106. FIG. 7A illustrates a screen layout 700 showing an initial random arrangement of unassigned images 702. In some aspects, the background behind the images 702 may be a single color (e.g., grey) indicative of the unassigned group. In this example, each image 702 represents daily activity level for a patient over a week, measured with wearable sensors. Each image 702 may be located at a center of gravity of a cell in a Voronoi treemap presented by the visual data labeling system 100. In at least some aspects, the researcher may interact with (e.g., hover a cursor over) a respective image 702 to obtain more information about the data that the respective image 702 represents. The researcher may create groups and add images 702 to the created groups by interacting with the images 702, according to the example process 200. The example screen layout 710 shows a group 712 including at least the image 720, a group 714 including at least the image 722, a group 716 including at least the image 724, and a group 718 including at least the image 726. In this example, the group 712 corresponds to patient data with normal sleep patterns, the group 714 corresponds to patient data with sleep patterns including naps, the group 716 corresponds to anomalous patient data, and the group 718 corresponds to patient data with pathological sleep patterns. In various aspects, the background behind the respective images 720, 722, 724, 726 may be a different color. For example, the background behind the image 720 may be light blue, the background behind the image 722 may be orange, the background behind the image 724 may be dark blue, and the background behind the image 726 may be green.

In some aspects, the images 720, 722, 724, and 726 may be representative images for their respective groups 712, 714, 716, and 718 when their respective groups 712, 714, 716, and 718 are in a collapsed state. Stated differently, the images 720, 722, 724, and 726 may be the only images that appear on the screen layout 710 for their respective groups 712, 714, 716, and 718 even as additional images 702 are added to the respective groups 712, 714, 716, and 718. In some aspects, the researcher may change the representative image for a respective group 712, 714, 716, 718. For example, the researcher may double select or click on an image 702 in the group 712 that is not already the representative image to make the image 702 the new representative image.

In at least some aspects, a size of a group 712, 714, 716, or 718 may change as images 702 are added or removed from a respective group 712, 714, 716, and 718. In such aspects, the size of the unassigned group changes proportionally. For example, as images 702 are added to the groups 712, 714, 716, and 718, the size of the groups 712, 714, 716, and 718 proportionally increase and the size of the unassigned group proportionally decreases, as shown in the screen layout 730. In some aspects, an increase in size of a respective group 712, 714, 716, or 718 may correlate to a quantity of images 702 added to the respective group 712, 714, 716, or 718 or another suitable weighting factor.

In some aspects, the researcher may expand a respective group 712, 714, 716, or 718 to show all of the images contained within the respective group 712, 714, 716, or 718. For example, the researcher may double select or click on the representative image of a respective group 712, 714, 716, or 718 to expand or collapse the respective group 712, 714, 716, or 718. The example screen layout 740 illustrates each of the groups 712, 714, 716, and 718 in an expanded state. With the groups 712, 714, 716, and 718 in the expanded state, the researcher may, for example, look for possible remaining mismatches that may influence creating a new group or moving an image 702 to a different group. In some aspects, a size of an image 702 may be adjusted (e.g., using a scroll wheel of a mouse or a two finger motion). In various instances, a size of an image 702 may be adjusted individually, or the sizes of multiple images 702 may be adjusted at the same time. Adjusting the size of one or more images 702 may be helpful when there are a large amount of images 702 on the screen layout 740.

In at least some aspects, when a group is in an expanded state, its representative image is highlighted in a suitable manner (e.g., bolded or thicker outline) to indicate to the researcher that it is the representative image. This indicates to the researcher which image to double select or click to collapse a group. In various instances, the researcher may download the grouped data from the visual data labeling system 100 for further cross-analysis with biometrics and demographics of the patients.

As described, a cell may translate consistently with a cursor (or other suitable selection means described herein) as a cursor drags the cell, and an arrangement of cells may adjust as the cell translates within the arrangement. In at least some aspects of the present disclosure, to enable this displayed motion, the visual data labeling system 100 utilizes a force-directed power diagram technique. The force-directed power diagram technique enables a user to control a cell during a move-cell interaction (e.g., dragging a power cell within its parent cell with a drag-move-drop mouse interaction) in a more predictable and stable way as compared to typical systems, which helps the user steer the layout in the user's intended way.

The provided force-directed power diagram technique relies on the duality of the cells to a set of circles in the plane. Stated differently, in at least some aspects, the rendered interactive Voronoi treemap layout is that of the nested power cells, but the position and area of the cells are controlled with a force-directed approach applied to the cells' underlying dual circles. A power diagram of a Voronoi treemap may include any arrangement of a set of circles, and when all circle centers are mutually outside other circles, the cells corresponding to the circles overlap most of their circles, contain their respective circle's center, and are approximately matching their circle's area and position (e.g., small/big circles correspond to small/big cells). For example, this can be seen in the example cell arrangements 802, 804, and 806 illustrated in FIG. 8 showing an example process 800 of a move operation (drag-and-drop). A cell 812 overlaps its circle 808, contains the center or node 810 of the circle 808, and approximately matches the area of the circle 808 as compared to the other circles and corresponding cells in the cell arrangement 802.

In at least some aspects, the provided force-directed power diagram technique of the visual data labeling system 100 utilizes a force-directed model. Force-directed models assume graphical objects (typically nodes of a network) are part of a physical space ((x, y) position) and get mechanical, gravity and electrostatic forces applied to them. In an example, the visual data labeling system 100 may utilize the d3-force API. The d3-force API includes a variety of simulated forces, such as a centering force, attraction and repulsion forces, anti-collision forces, and linking the forces.

The centering force translates nodes uniformly so that the mean position of all nodes (the center of mass if all nodes have equal weight) is at the given position (x,y). This force modifies the positions of nodes on each application; it does not modify velocities, as doing so would typically cause the nodes to overshoot and oscillate around the desired center. This force helps keeps nodes in the center of the viewport, and unlike the positioning force, it does not distort their relative positions. In some instances, a strength of the centering force may be set. The visual data labeling system 100 may utilize a centering force to translate all objects (e.g., centers or nodes of circles corresponding to cells) to maintain a center of gravity of the whole set of objects. In various aspects, the centering force may be turned on or off.

Attraction and repulsion forces (e.g., a manybody or n-body force) apply mutually amongst all circle nodes. It can be used to simulate gravity (attraction) if the strength is positive, or electrostatic charge (repulsion) if the strength is negative. In some aspects, quadtrees and the Barnes-Hut approximation may be used to improve performance. In such aspects, accuracy can be customized using a theta parameter. In some aspects, a strength of the attraction and repulsion forces can be modified. If a strength of attraction and/or repulsion force is specified, the visual data labeling system 100 may set a strength accessor to the specified strength (e.g., value or function), determine the strength accessor for each node, and return this determined force. The visual data labeling system 100 may utilize attraction and repulsion forces to control, in part, how cells interact with one another in an arrangement. For instance, a positive value causes nodes to attract each other, similar to gravity, while a negative value causes nodes to repel each other, similar to electrostatic charge.

Anti-collision force treats nodes as circles with a given radius, rather than points, and prevents nodes from overlapping. Stated differently, two nodes A and B are separated so that the distance between A and B is at least a radius of A plus a radius of B. In some aspects, a strength and iteration count of the anti-collision force is adjustable. The visual data labeling system 100 may utilize anti-collision force to help prevent objects (images and their corresponding cells) from overlapping when stationary and while one of the images and its corresponding cell is translated within the arrangement.

Positioning or linking force pushes linked nodes together or apart according to a desired link distance. The strength of the force is proportional to the difference between the linked nodes' distance and a predetermined distance, similar to a spring force. If a user doesn't translate a cell and its node farther than the predetermined distance, the cell will translate back to its initial position. The visual data labeling system 100 may utilize positioning or linking force to help, in part, enforce stability of a cell arrangement.

Referring to FIG. 8, it can be assumed that each cell (e.g., the cell 812) of the parent cell 814 is assigned a circle (e.g., the circle 808) with two position parameters (x and y coordinates) and a radius R. The positioning of cells within an arrangement of cells may be determined based on the simulated forces of a force-directed model, such as the d3-force API described above. For example, in a static mode, when each of these cells in the parent cell 814 are stationary, a centering force, attraction and repulsion forces, and anti-collision forces may be applied. The example cell arrangement 802 illustrates the circle 808, its corresponding cell 812, and the surrounding circles and their corresponding cells, in a static mode. In the static mode, each circles' radius is gradually grown at a factor $\alpha$ of its target weight $w_i$. For example, the radius $R_i$ of a circle may be calculated according to Equation 1 below, in which A is an area of the parent cell 814 of the Voronoi treemap. In various aspects, the growth factor $\alpha$ may be controlled to find a growth factor $\alpha$ that minimizes the error between the area of the cells and a target area. In some aspects, a determined optimal radius for every node may be used in a move mode.

$$R_i(\alpha) = \sqrt{\frac{\alpha * A * w_i}{\pi}} . \qquad \text{Equation 1}$$

The move mode refers to instances in which a user performs an action that involves translating an image and its corresponding cell within a cell arrangement. For example, the process 800 illustrates a drag-and-drop action of the circle 808 and its corresponding cell 812 that may be utilized to, for example, add an image corresponding to the circle 808 and cell 812 to a group (e.g., the example process 200). In various aspects of the move mode, attraction and repulsion forces, anti-collision forces, and positioning or linking forces may be applied. In some aspects, the centering force is turned off or deactivated in the move mode. In some aspects, the anti-collision forces in the move mode may be greater than anti-collision forces in the static mode. The greater anti-collision forces in the move mode may help a dragged circle (e.g., the circle 808) maintain space for its corresponding cell (e.g., the cell 812) by pushing apart the surrounding circles as the circle is dragged. Table 1 below shows example parameters used in the static and move modes respectively.

TABLE 1

| | Simulated Force | | | |
| Mode | Centering | Attraction/Repulsion | Anti-Collision | Linking |
| --- | --- | --- | --- | --- |
| Static | On | 1000 | 1 | 0 |
| Move | Off | 0 | 2 | 10 |

From the example cell arrangement 802, the circle 808 and its corresponding cell 812 are dragged or translated diagonally to the opposite side of the parent cell 814. The example cell arrangement 804 illustrates the circle 808 and its corresponding cell 812 partially dragged or translated towards its final destination. As compared to the cell arrangement 802, the cells surrounding the cell 812 have adjusted by changing shape and/or position in the cell arrangement 804 based on the simulated forces between the cells in the parent cell 814, to accommodate the moving cell 812. The example cell arrangement 806 illustrates the circle 808 and is corresponding cell 812 at its final destination at the completion of the drag-and-drop action. In some aspects, at the conclusion of the move mode (e.g., completion of the drag-and-drop action), new positioning or linking forces may be initiated based on the new cell arrangement 806 in order to maintain each circle at its new final position, and come back to a stand-by static mode.

In utilizing the forces from the force-directed model, the visual data labeling system 100 provides a Voronoi treemap with smoother interactions than typical systems. For example, when a user performs a drag-and-drop action on an image using a cursor 210, the image and its corresponding cell and circle fluidly follow the cursor 210, which is not true of typical systems. In some aspects, a parameter may be utilized that enables a user to control a trade-off between stability and area accuracy (e.g., between a circle and its corresponding cell) of the Voronoi treemap. For example, for a low parameter value, all circle radii are small and the cell arrangement (e.g., power diagram) tends toward a standard unweighted Voronoi treemap, and which the areas of the cells do not match the target weights, and accuracy is low. Because the radii are small, however, there is a smaller chance of collisions and therefore the layout stability is greater than a high parameter value. For a high parameter value, all circle radii may be optimized, the cell areas are better matching the target weights, and accuracy is higher. However, now the chances of collision and dramatic change of layout are higher, leading to a lower stability than the low parameter value. In such aspects with a parameter value, a user may adjust the parameter value to alter these features.

Figure 9:
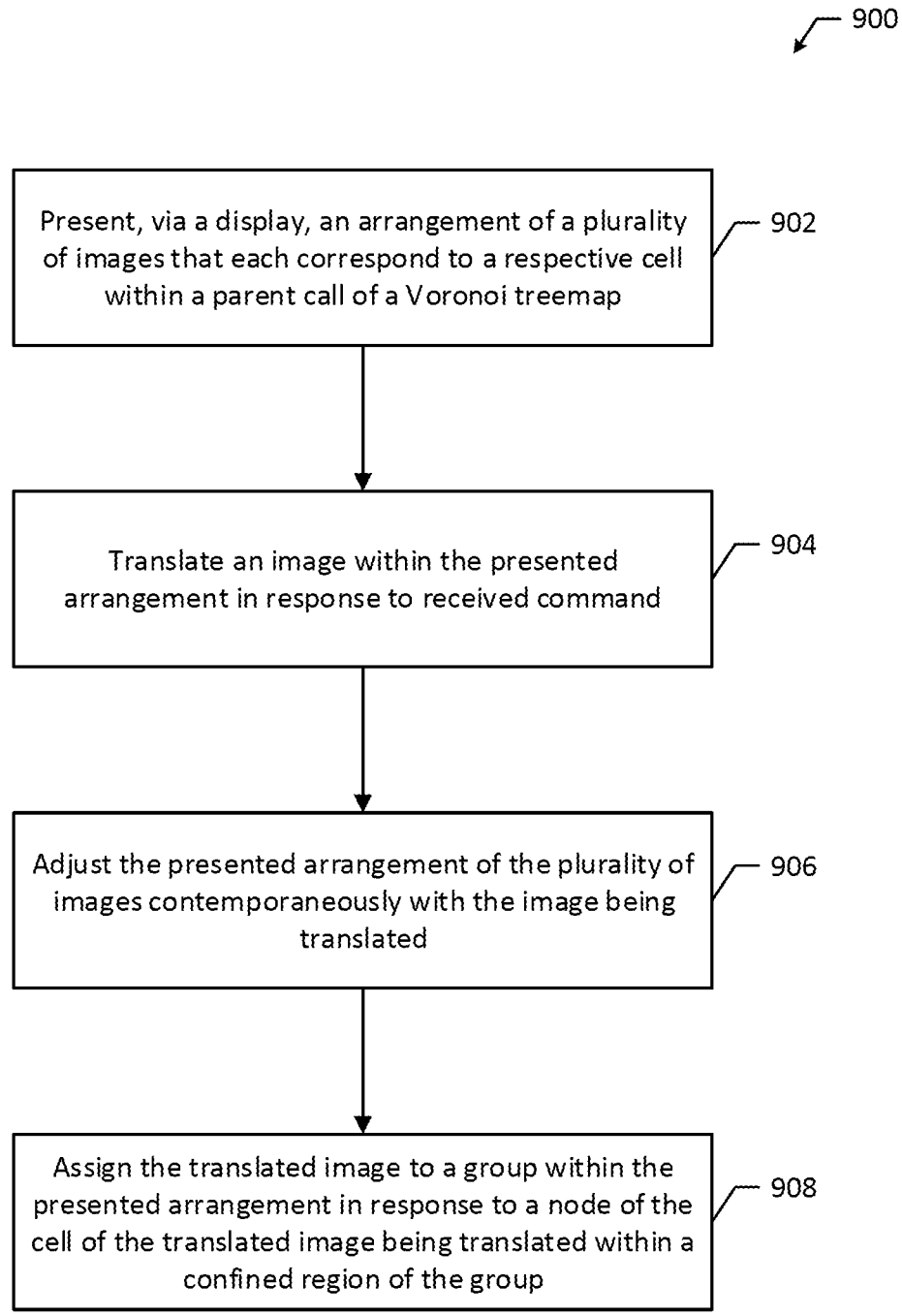
FIG. 9 illustrates a flow chart of a method for interactive data labeling, according to an aspects of the present disclosure.

FIG. 9 shows a flow chart of an example method 900 for interactive data labeling. Although the example method 900 is described with reference to the flowchart illustrated in FIG. 9, it will be appreciated that many other methods of performing the acts associated with the method 900 may be used. For example, the order of some of the blocks may be changed, certain blocks may be combined with other blocks, and some of the blocks described are optional. The method 900 may be performed by processing logic that may comprise hardware (circuitry, dedicated logic, etc.), software, or a combination of both.

In some aspects, the method 900 may begin by presenting, via a display (e.g., the display 106), an arrangement of a plurality of images that each correspond to a respective cell (e.g., the cells 216, 218, 220, 222) within a parent cell (e.g., the parent cell 234) of a Voronoi treemap (block 902). For example, the visual data labeling system 100 may present such arrangement on the display 106. In some aspects, each respective cell includes a node (e.g., the node 214).

An image 702 may be translated within the presented arrangement in response to a received command (block 904). For example, the visual data labeling system 100 may receive a command from a user that includes the user selecting an image 702 with the cursor 210 and dragging the image 702, and in response the visual data labeling system 100 may translate the image 702 within the presented arrangement corresponding to the user's dragging motion. In this example, the image 702 may correspond to the cell 218. The visual data labeling system 100 therefore translates the cell 218 within the arrangement of cells as the image 702 is translated. In other examples, a different suitable command described herein may be received from the user.

The presented arrangement of the plurality of images may be adjusted contemporaneously with the image 702 being translated (block 906). For example, as the image 702 is dragged within the presented arrangement, the surrounding images may move out of the way so that they do not contact the image 702 being dragged. The visual data labeling system 100 may accomplish this by adjusting the shape and positioning of the cells 216, 218, 220, and 222 corresponding to those images as the image 702 and its corresponding cell 218 are translated through the arrangement. In some aspects, the presented arrangement of the plurality of images is adjusted based on simulated forces of a force-directed model. In such aspects, these simulated forces are applied to circles associated with the cells that correspond to the images in the arrangement.

The translated image 702 may be assigned to a group (e.g., the group 242) within the presented arrangement in response to the node 214 of the cell 218 of the translated image 702 being translated within a confined region of the group 242 (block 908). For example, the command received by the visual data labeling system 100 from the user may include the user releasing the selection of the image 702 once the node 214 of its corresponding cell 218 is positioned within a colored region designating the group 242, which triggers adding the image 702 to the group 242. In various aspects, the image 702 may be centered on the node 214 of its cell 218 and therefore dragging the center of the image 702 into the colored region of the group 242 drags the node 214 into the region.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. An interactive data labeling system comprising:
   a display;
   a memory; and
   a processor in communication with the memory, the processor configured to:
   present, via the display, an arrangement of a plurality of images that each correspond to a respective cell within a parent cell of a Voronoi treemap, wherein each respective cell includes a node;
   translate an image within the presented arrangement in response to a received command;
   adjust the presented arrangement of the plurality of images contemporaneously with the image being translated; and
   assign the translated image to a group within the presented arrangement in response to the node of the cell of the translated image being translated within a confined region of the group,
   wherein each respective cell is associated with a respective circle having a radius and the node of the respective cell, wherein the node is associated with positional coordinates, and wherein the radius $R_i$ of a respective circle is calculated according to:

$$R_i(\alpha) = \sqrt{\frac{\alpha * A * w_i}{\pi}}$$

wherein
- α is a growth factor,
- $w_i$ is a target weight of the respective circle, and
- A is an area of the parent cell of the Voronoi treemap.

2. The interactive data labeling system of claim 1, wherein the received command includes a selection of the image and a dragging of the selected image with respect to the display, and wherein the image is translated as it is dragged.

3. The interactive data labeling system of claim 1, wherein the presented arrangement of the plurality of images is adjusted based on the respective cells of each of the plurality of images.

4. The interactive data labeling system of claim 1, wherein in a static mode, when an image is not being translated, the arrangement of the plurality of images is based on simulated forces between the respective circles of the cells of each of the plurality of images.

5. The interactive data labeling system of claim 4, wherein the nodes of all the circles as a whole have a simulated center of gravity and the simulated forces include a centering force that maintains the simulated center of gravity.

6. The interactive data labeling system of claim 5, wherein in a move mode, when an image is being translated, the centering force is turned off.

7. The interactive data labeling system of claim 4, wherein the simulated forces include attraction and repulsion forces between two respective circles.

8. The interactive data labeling system of claim 4, wherein the simulated forces include an anti-collision force that prevents respective circles from overlapping.

9. The interactive data labeling system of claim 4, wherein in a move mode, when an image is being translated, the arrangement of the plurality of images is adjusted based on the simulated forces between the respective circles of the cells of each of the plurality of images.

10. The interactive data labeling system of claim 9, wherein the simulated forces include a linking force between a first position of the node of a respective cell and a second position of the node of the respective cell.

11. The interactive data labeling system of claim 1, wherein the processor is further configured to generate a new group in response to the node of the cell of the translated image being translated to or outside of a boundary of the Voronoi treemap, the boundary being outside of an established group.

12. A method for interactive data labeling comprising:
- presenting, via a display, an arrangement of a plurality of images that each correspond to a respective cell within a parent cell of a Voronoi treemap, wherein each respective cell includes a node;
- translating an image within the presented arrangement in response to a received command;
- adjusting the presented arrangement of the plurality of images contemporaneously with the image being translated; and
- assigning the translated image to a group within the presented arrangement in response to the node of the cell of the translated image being translated within a confined region of the group,
- wherein each respective cell is associated with a respective circle having a radius and the node of the respective cell, wherein the node is associated with positional coordinates, and wherein the radius $R_i$ of a respective circle is calculated according to:

$$R_i(\alpha) = \sqrt{\frac{\alpha * A * w_i}{\pi}}$$

wherein
- α is a growth factor,
- $w_i$ is a target weight of the respective circle, and
- A is an area of the parent cell of the Voronoi treemap.

13. The method of claim 12, wherein the image is a first image, further comprising transferring a second image to the group in response to a received command, wherein such transfer includes the image disappearing from an initial position and appearing within the confined region of the group.

14. The method of claim 12, wherein the group is a first group, further comprising generating a second group from multiple cells at once in response to a received command.

15. The method of claim 12, wherein the group is a first group, further comprising merging the first group and a second group in response to a received command.

16. The method of claim 12, wherein the group includes multiple cells, further comprising translating the group within the arrangement in response to a received command.

17. A non-transitory, computer-readable medium storing instructions, which when executed by a processor, cause the processor to:
- present, via the display, an arrangement of a plurality of images that each correspond to a respective cell within a parent cell of a Voronoi treemap, wherein each respective cell includes a node;
- translate an image within the presented arrangement in response to a received command;
- adjust the presented arrangement of the plurality of images contemporaneously with the image being translated; and
- assign the translated image to a group within the presented arrangement in response to the node of the cell of the translated image being translated within a confined region of the group,
- wherein each respective cell is associated with a respective circle having a radius and the node of the respective cell, wherein the node is associated with positional coordinates, and wherein the radius $R_i$ of a respective circle is calculated according to:

$$R_i(\alpha) = \sqrt{\frac{\alpha * A * w_i}{\pi}}$$

wherein
- α is a growth factor,
- $w_i$ is a target weight of the respective circle, and
- A is an area of the parent cell of the Voronoi treemap.

18. The non-transitory, computer-readable medium of claim 17, wherein in an initial presented arrangement of the plurality of images, each of the images is part of a single, unassigned group.

* * * * *